US008340298B2

(12) United States Patent
Gelfond et al.

(10) Patent No.: US 8,340,298 B2
(45) Date of Patent: Dec. 25, 2012

(54) KEY MANAGEMENT AND USER AUTHENTICATION FOR QUANTUM CRYPTOGRAPHY NETWORKS

(75) Inventors: Robert Gelfond, New York, NY (US); Audrius Berzanskis, Cambridge, MA (US)

(73) Assignee: MagiQ Technologies, Inc., Somerville, MA (US)

(*) Notice: Subject to any disclaimer, the term of this patent is extended or adjusted under 35 U.S.C. 154(b) by 549 days.

(21) Appl. No.: 12/225,560

(22) PCT Filed: Apr. 16, 2007

(86) PCT No.: PCT/US2007/009236
§ 371 (c)(1),
(2), (4) Date: Sep. 24, 2008

(87) PCT Pub. No.: WO2007/123869
PCT Pub. Date: Nov. 1, 2007

(65) Prior Publication Data
US 2009/0175452 A1    Jul. 9, 2009

Related U.S. Application Data

(60) Provisional application No. 60/792,764, filed on Apr. 18, 2006.

(51) Int. Cl.
*H04L 9/00* (2006.01)
*H04L 9/08* (2006.01)
*H04L 29/06* (2006.01)

(52) U.S. Cl. ........ 380/277; 380/259; 380/262; 380/268; 380/278; 380/279; 380/44; 380/46; 380/47; 713/153; 713/155; 713/156; 713/161; 713/169; 713/170; 713/171; 713/173; 713/175; 726/2; 726/3; 726/4; 726/6; 726/10; 726/26; 726/28; 726/30

(58) Field of Classification Search ................... 380/277, 380/279, 44; 713/155, 171, 153; 726/5–6
See application file for complete search history.

(56) References Cited

U.S. PATENT DOCUMENTS

| 5,515,438 A * | 5/1996 | Bennett et al. ............... 380/278 |
| 6,801,626 B1 * | 10/2004 | Nambu ......................... 380/256 |
| 7,068,790 B1 * | 6/2006 | Elliott ........................... 380/278 |
| 7,430,295 B1 * | 9/2008 | Pearson et al. ............... 380/256 |
| 7,869,599 B2 * | 1/2011 | Tajima .......................... 380/256 |
| 2005/0135620 A1 * | 6/2005 | Kastella et al. .............. 380/256 |
| 2005/0152540 A1 * | 7/2005 | Barbosa ........................ 380/28 |
| 2005/0259825 A1 * | 11/2005 | Trifonov ....................... 380/277 |

(Continued)

OTHER PUBLICATIONS

Williams Perkins, Trusted Certificates in Quantum Cryptography, Mar. 2006, pp. 1-3.*

*Primary Examiner* — Edan Orgad
*Assistant Examiner* — Jenise Jackson
(74) *Attorney, Agent, or Firm* — Opticus IP Law PLLC

(57) ABSTRACT

Key management and user authentication systems and methods for quantum cryptography networks that allow for users securely communicate over a traditional communication link (TC-link). The method includes securely linking a centralized quantum key certificate authority (QKCA) to each network user via respective secure quantum links or "Q-links" that encrypt and decrypt data based on quantum keys ("Q-keys"). When two users (Alice and Bob) wish to communicate, the QKCA sends a set of true random bits (R) to each user over the respective Q-links. They then use R as a key to encode and decode data they send to each other over the TC-link.

8 Claims, 5 Drawing Sheets

U.S. PATENT DOCUMENTS

| | | |
|---|---|---|
| 2005/0286723 A1 | 12/2005 | Vig et al. |
| 2006/0029398 A1* | 2/2006 | Liu et al. ................. 398/188 |
| 2006/0056630 A1 | 3/2006 | Zimmer |
| 2006/0093143 A1* | 5/2006 | Maeda et al. ................. 380/256 |
| 2009/0003591 A1* | 1/2009 | Murakami et al. ............. 380/28 |
| 2010/0239092 A1* | 9/2010 | Kuang ......................... 380/256 |

* cited by examiner

KEY MANAGEMENT AND USER AUTHENTICATION FOR QUANTUM CRYPTOGRAPHY NETWORKS

CLAIM OF PRIORITY

This patent application claims the benefit of priority of U.S. Provisional Patent Application Ser. No. 60/792,764, filed on Apr. 18, 2006, which application is incorporated by reference herein, and of PCT Patent Application Serial No. PCT/US2007/009,236, filed on Apr. 16, 2007, which application is incorporated by reference herein.

TECHNICAL FIELD OF THE INVENTION

The present invention relates to quantum communication, and in particular relates to and has industrial utility in connection with systems and methods of key management and user authentication in quantum cryptography networks.

BACKGROUND ART

QKD involves establishing a key between a sender ("Alice") and a receiver ("Bob") by using either single-photons or weak (e.g., 0.1 photon on average) optical signals (pulses) called "qubits" or "quantum signals" transmitted over a "quantum channel." Unlike classical cryptography whose security depends on computational impracticality, the security of quantum cryptography is based on the quantum mechanical principle that any measurement of a quantum system in an unknown state will modify its state. As a consequence, an eavesdropper ("Eve") that attempts to intercept or otherwise measure the exchanged qubits will introduce errors that reveal her presence.

The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175-179 (IEEE, New York, 1984). Specific QKD systems are described in U.S. Pat. No. 5,307,4100 to Bennett, and in the article by C. H. Bennett entitled "Quantum Cryptography Using Any Two Non-Orthogonal States", Phys. Rev. Lett. 68 3121 (1992). The general process for performing QKD is described in the book by Bouwmeester et al., "The Physics of Quantum Information," Springer-Verlag 20001, in Section 2.3, pages 27-33.

QKD systems were first developed in the form of a simple point-to-point connection between two users, called "Alice" and "Bob." Nowadays, QKD systems are being considered as part of QKD-based networks that include multiple users as nodes in a dedicated QKD-system network, or multiple users incorporated into an existing classical telecommunications network.

The extension of QKD from point-to-point communication to network-type communication introduces some logistical issues. For example, QKD-based networks require the multiple users to have a process for establishing a common "quantum key" between any two users prior to their communicating with each other, even if they have never communicated with each other and/or even if they do not have a direct communication link. Furthermore, in view of the fact that a given user will often need to selectively communicate with one or just a few of the total number of users, there needs to be a way to authenticate the users with whom they are communicating to ensure their message is shared with a party intended to receive the message. In addition, quantum cryptography employs symmetric keys key rather than public keys key (asymmetric) cryptography used with public key infrastructure (PKI) cryptography.

DESCRIPTION OF THE INVENTION

An aspect of the invention is a method of establishing a secure communication link between first and second users Alice and Bob connected by a traditional communication link. The method includes establishing first and second secure quantum links (Q-links) between a quantum key certification authority (QKCA) and Alice and Bob, respectively. The method also includes generating at the QKCA a set R of truly random bits, and distributing R over the respective Q-links to Alice and Bob. The method also includes Alice and Bob using R as an encryption key to securely communicate over the traditional communication link.

Figure 1:
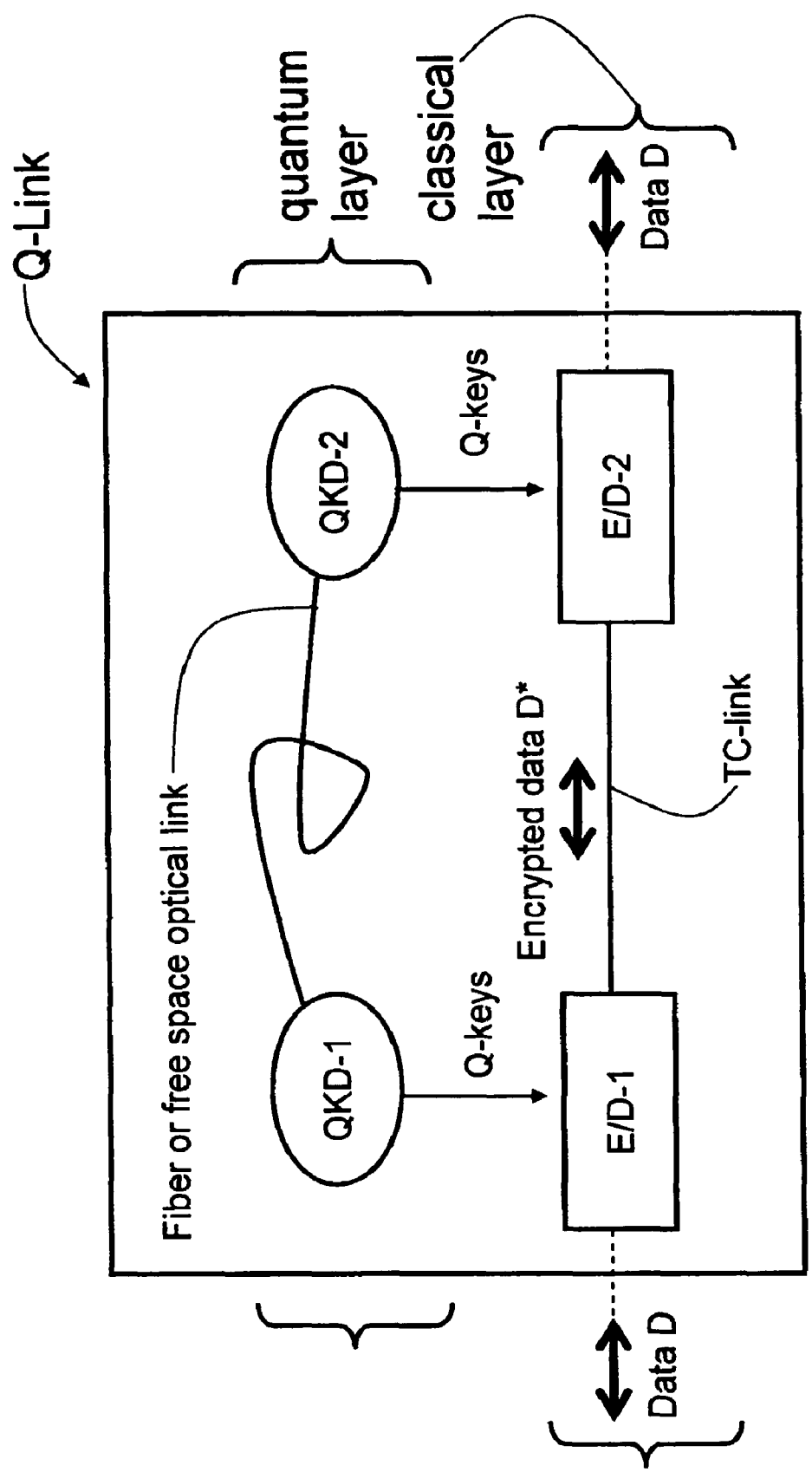
FIG. 1 is a schematic diagram of a Q-link as used in the present invention.

The various elements depicted in the drawing are merely representational and are not necessarily drawn to scale. Certain sections thereof may be exaggerated, while others may be minimized. The drawing is intended to illustrate an example embodiment of the invention that can be understood and appropriately carried out by those of ordinary skill in the art.

DETAILED DESCRIPTION OF THE INVENTION

FIG. 1 is a schematic diagram of a quantum link or "Q-link" in which a communication channel is protected by quantum cryptography (e.g., quantum key distribution or "QKD"). In its basic form, the Q-link includes a quantum layer having two operably coupled QKD stations, QKD-1 and QKD-2, and a classical layer having a classical (traditional) communication line protected by a symmetric key encryption protocol (e.g., one-time pad) that employs quantum keys provided by the QKD stations.

The classical layer includes encryptor/decryptor (E/D) units ED-1 and ED-2 coupled to respective QKD stations QKD-1 and QKD-2. The E/D units are adapted to receive data D, encrypt the data to form encrypted data D* and then transmit the encrypted data D* over the traditional communication channel. Likewise, each E/D unit is adapted to receive encrypted data D* and decrypt it to recover data D. The encrypting and decrypting of data is performed using Q-keys provided by the quantum layer.

EXAMPLE EMBODIMENTS

The present invention refers to a "quantum network" or "Q-network," which describes a communication infrastructure that includes Q-links and a traditional network communication infrastructure with a number n of users. The present invention employs a novel key management and authentication architecture. Example embodiments of how the QKI architecture of the present invention is used in Q-networks are described below.

First Example Embodiment

Figure 2:
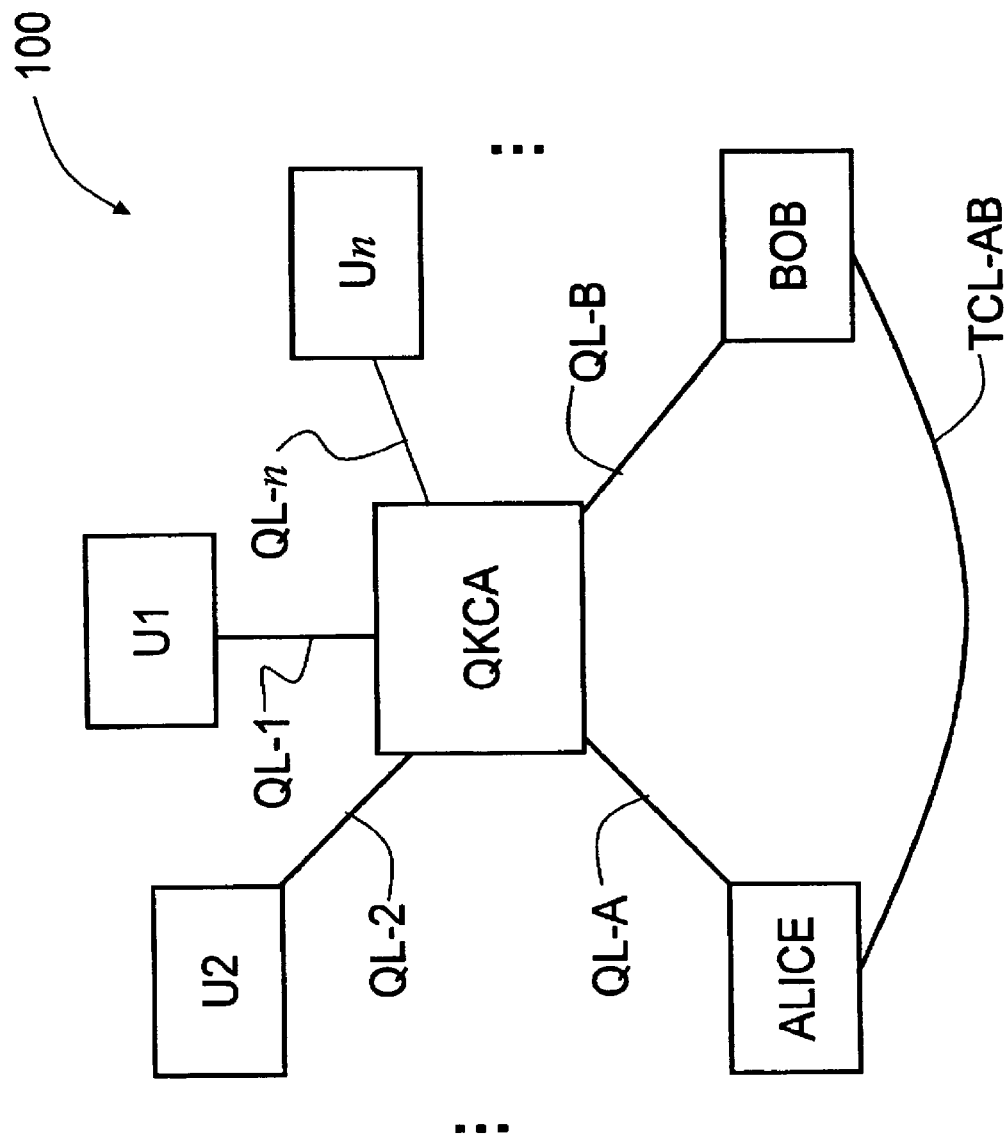
FIG. 2 is a schematic diagram of a first example of a star-topology Q-network that includes the QKI architecture of the present invention.

FIG. 2 illustrates an example of a star-topology Q-network 100 that includes an example embodiment of the QKI architecture according to the present invention. The QKI architecture in Q-network 100 includes a Quantum Key Certificate Authority, or QKCA.

Figure 3:
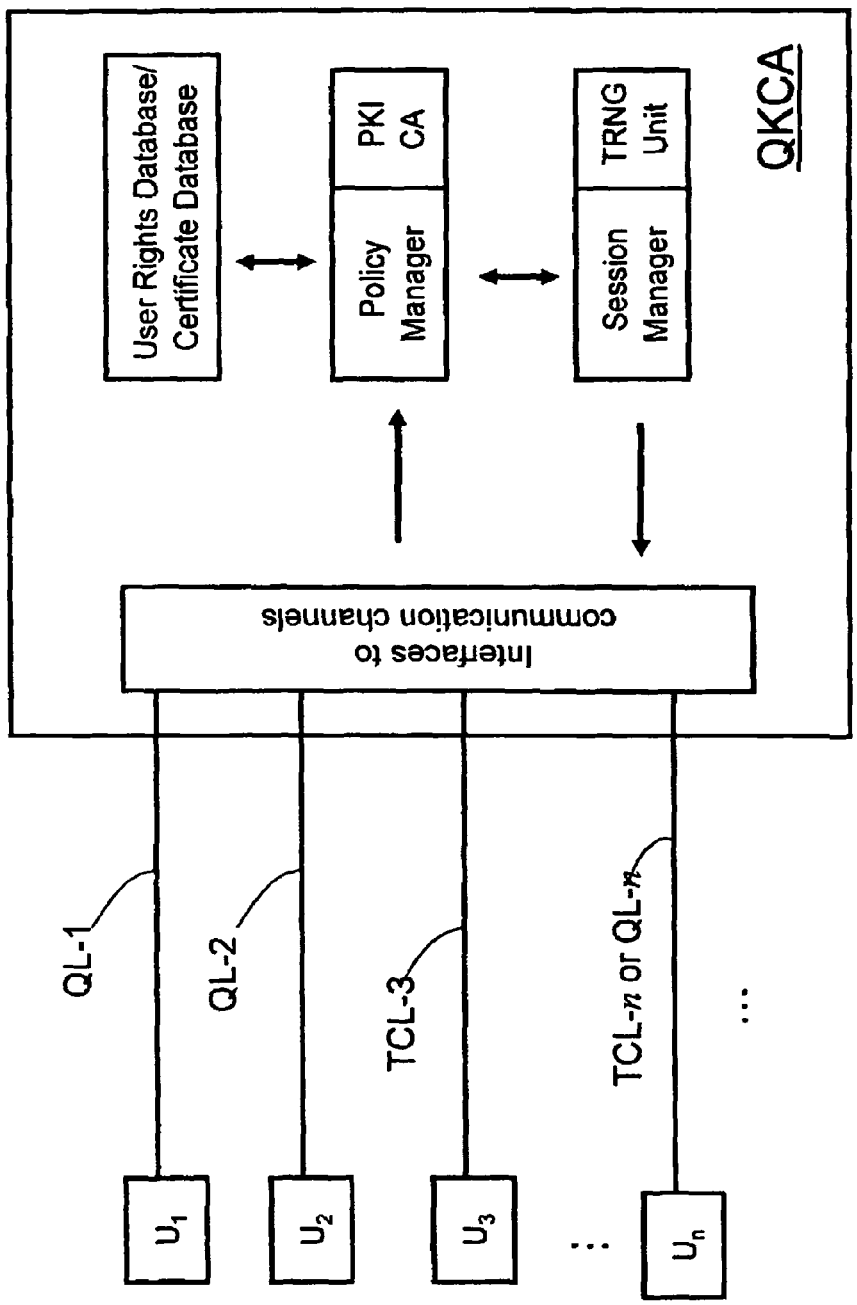
FIG. 3 is a detailed schematic diagram of an example quantum key certificate authority (QKCA) module that serves as a key manager and authentication center for the QKI architecture.

FIG. 3 is a schematic diagram of an example embodiment of a QKCA according to the present invention. The QKCA is a trusted third party, i.e., it is an entity that issues authentication certificates (ACs) for use by other parties. Its functionality is similar to that of Certificate Authority in PKI. It is a point where Q-links are securely terminated. A Q-link provides an authenticated link between an end user and QKCA. On the other hand, two Q-links connected via a trusted third party—here, the QKCA—provide an authenticated channel for the end points (users).

Though in general the functionality of QKCA is similar to that of CA in PKI, there are some differences. A CA in PKI issues digital certificates that couple the identity of a network user to its public/private key pair. In quantum cryptography, there is no such public/private key pair. Rather, the keys are symmetric. The QKCA extends the conventional CA by adding Q-key management functionality. In parallel to the "quantum" functionality, the QKCA can still operate as a standard CA providing standard PKI functions to the users connected to QKCA via traditional communication links ("TC-links"). From this point of view, QKCA provides a superset of cryptographic operations in comparison to CA.

The very presence of a an operational Q-link between QKCA and a user U ensures a channel of authenticated communication between the two. Initial authentication occurs during the installation of the Q-link. Later on, the authentication keys can be refreshed by quantum keys generated by QKD in Q-link and this has to be defined by the security policies of the network. In that way, the authentication of the end nodes is preserved during O-link operation.

With continuing reference to FIG. 3, the QKCA has a policy manager and a User Rights Database that includes information on the users U of the Q-network, along with their respective rights and security definitions. All requests from the users U come to a Policy Manager, which consults the User Rights Database and makes a decision whether to deny or to allow the requested operation. In an example embodiment, the User Rights Database contains information about the communication security requirements among users.

For example, user $U_3$ who only has a TC-link TCL-3 with the QKCA may ask to establish a communication session with a user $U_1$ connected via a Q-link QL-1 with the QKCA. The Policy Manager consults the User Rights Database to see if user $U_1$ is allowing communication with user $U_3$ over links protected just by traditional cryptography. If not, the Policy Manager denies that request. Otherwise, the Policy Manager allows a communication session to be established.

The QKCA also includes a Session Manager that gets involved in case the communication request is approved by the policy manager. The Session Manager creates a communication session between two users. In case the users U are connected by Q-links with the QKCA, the Session Manager provides them with sets of random bits R from a TRNG Unit.

The random bits R are used for encrypting direct communication between the users. The TRNG Unit can be any one of the known types of truly random number generators. Note that the communication between such users is protected by the highest level of security provided by quantum cryptography even though the users are not connected by a QKD device of any sort; they also need not share any optical communication line.

If the users U are connected with the QKCA by TC-links, then the functionality of the QKCA replicates that of conventional CA in PKI.

The QKCA also includes interfaces to the different communication channels, namely the Q-links and the TC-links.

There is more variety when one of the users is connected with the QKCA via a TC-link and the other via a Q-link. Depending on the policies set by the users, the whole scheme might switch to the standard PKI communication scheme as in the case of two TC-links, or they might decide to keep the strongest possible level of cryptography on the Q-link while doing traditional PKI based communication on the TC-link. In the latter case, the session manager provides set of random bits R to one user over the Q-link, and the same set to the other user over the TC-link encrypted by traditional cryptography.

The highest level of security is achieved only when the communicating parties share Q-links with the QKCA.

With reference again to FIG. 2, users U in Q-network 100 can only establish secure keys through the QKCA. For n network users U, if a subset of i users (i<n) want to communicate secrets amongst each other, then each of the i users contacts the QKCA with a request to establish a communication session.

With continuing reference to FIG. 2, Q-network 100 includes a number n of network users U (U1, U2, . . . Un) operably linked to the QKCA via Q-links QL (QL-1, QL-2, . . . QL-n, respectively). The n users include two users Alice and Bob operatively coupled to the QKCA via respective Q-links QL-A and Q-LB. The n users U are also linked by TC-links TCL, with one such link being TCL-AB between Alice and Bob.

The two main initial conditions of Q-network 100 are that all n users U trust the QKCA, and that Alice wants to communicate with Bob, though they are not directly connected by a Q-link. The only direct link between Alice and Bob is the TC-link CL-AB. The protocol Alice and Bob follow in order to securely communicate is as follows. First, Alice issues a communication request to the QKCA over Q-link QL-A stating that she wishes to communicate with Bob. The QKCA passes the communication request to Bob via Q-link QL-B. If Bob responds to the QKCA that he wishes to communicate with Alice, then the QKCA sends a stream (set) R of truly random bits to Alice over Q-link QL-A and to Bob over Q-link QL-B. Recall, when set R is sent over a Q-link, it is encrypted and decrypted with a Q-key associated with the Q-link (see FIG. 1). Set R is generated by the TRNG Unit. Set R can be any random number unknown to all the users U except the users requesting communication.

At this point, Alice and Bob now share set R as generated by the QKCA. Alice and Bob then use set R as a key for securely communicating over any classical communication channel, such as the TC-link CL-AB.

Second Example Embodiment

Figure 4:
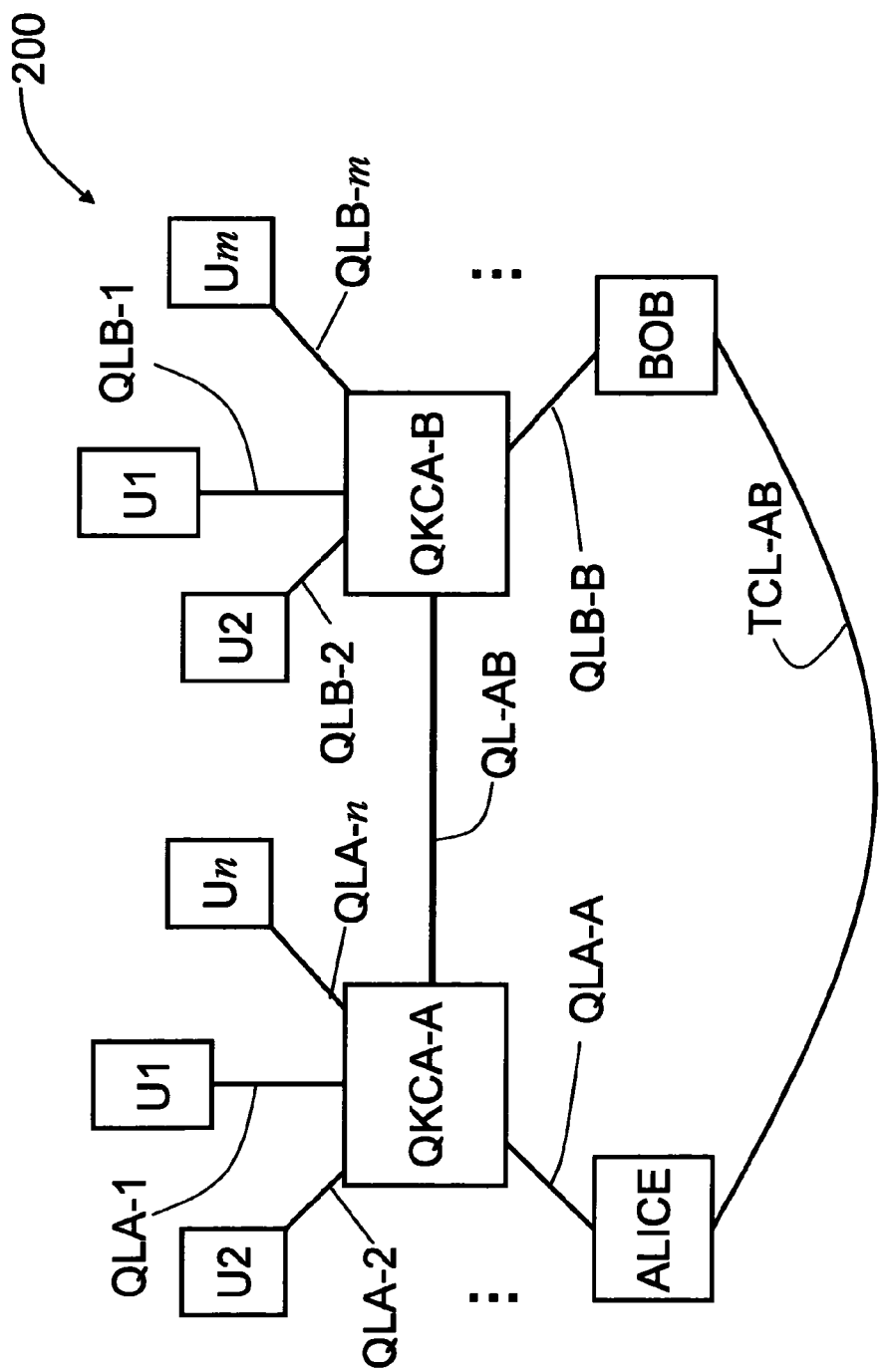
FIG. 4 is a schematic diagram of a first example of a star-topology Q-network that includes the QKI architecture of the present invention similar to that of FIG. 2, but that includes two QKCA modules Q-linked to one another.

FIG. 4 is a schematic diagram of a second example embodiment of a star-topology Q-network 200 that employs another example embodiment of the QKI architecture of the present invention. Q-network 200 is similar to that of FIG. 2, but includes two QKCAs, labeled QKCA-A and QKCA-B, operably coupled to one another by a Q-link QL-AB. Q-network 200 has n network users UA (UA1, UA2, . . . UAn) operably linked to the QKCA-A via respective Q-links QLA-1, QLA-2, . . . QLA-n. One of the n users is user Alice.

Likewise, Q-network 200 has m additional network users UB (UB1, UB2, . . . UBm) operably linked to the QKCA-B via Q-links QLB-1, QLB-2, . . . QLB-m, respectively, including user Bob. The n users UA are also linked directly to each other and to the m users UB only via TC-links TCL, of which one such link TCL-AB is shown between Alice and Bob.

The two main initial conditions of Q-network 200 are that all n users UA and m users UB trust the QKCA-A and the QKCA-B, and that Alice wants to securely communicate with Bob, though they are only directly connected by TC-link TCL-AB.

The protocol Alice and Bob follow to securely communicate with one another over their TC-link TCL-AB is as follows. First, Alice issues a communication request to the QKCA-A over Q-link QL-A that she wishes to communicate with Bob. The QKCA-A routes this communication request to the QKCA-B over Q-link QL-AB, and the QKCA-B routes the communication to Bob over Q-Link QLB-B. If Bob accepts the communication request, then the QKCA-B generates a set R of truly random bits and sends R to both Bob and the QKCA-A over the corresponding Q-Links. The QKCA-A routes R to Alice over Q-link QL-A. Note than either the QKCA-A or the QKCA-B can generate R; The QKCA-B was chosen in the present example for the sake of illustration.

Other Aspects of the QKI Architecture

The QKI session can function in a streaming mode wherein Q-keys are streamed to users continuously or in a key-per-request mode wherein Q-keys of a given length are provided to each user per request.

New Q-Link User Authentication

Figure 5:
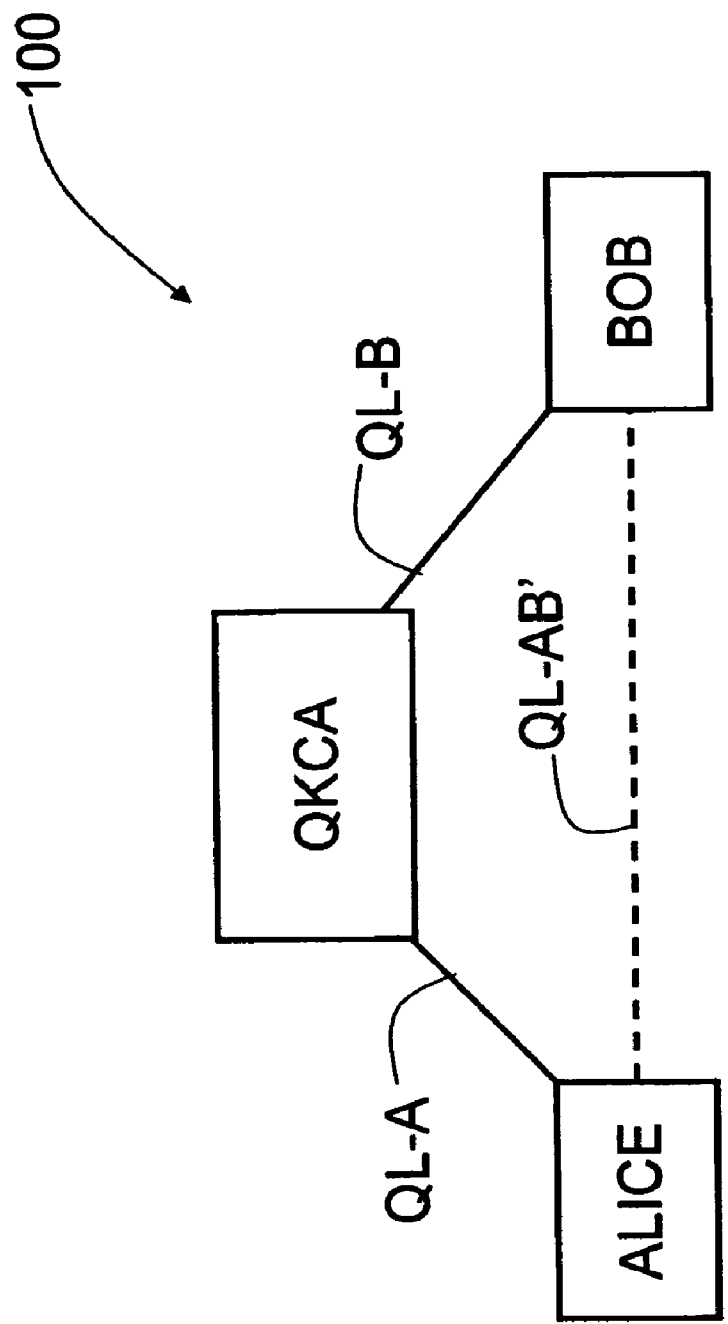
FIG. 5 is a schematic diagram of a portion of the Q-network of FIG. 2, illustrating how the QKI architecture of the present invention is used to authenticate a new Q-link established between Alice and Bob.

The QKI Q-network architecture of the present invention can be used to authenticate two users. FIG. 5 is the Q-network 100 of FIG. 1, showing just the two users Alice and Bob linked to the QKCA via Q-links QL-A and QL-B, In the present example embodiment, Alice and Bob are to be linked directly by a new Q-link QL-AB' (dashed line). Authentication is required to start QKD over the new Q-link.

The authentication protocol in this case involves either Alice or Bob requesting the QKCA to allow communication with the other over the direct Q-link QL-AB'. In response to an affirmative request by the other party, the QKCA provides Alice and Bob with an AC that includes a set R of truly random bits. Alice and Bob then use set R as an authentication key to set up a QKD session using their direct Q-link QL-AB'.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method of establishing a secure communication link between first and second users A and B in a quantum network ("Q-network"), where A and B are in direct communication with each other over only via a traditional communication link (TC-link) and in direct communication with respective first and second quantum key certification authorities (QK-CAs) via respective first and second Q-links, comprising:
   sending a set R of truly random bits from the second QKCA to B over the first Q-link;
   sending the set R from the second QKCA to the first QKCA over a third Q-link connecting the first and second QKCAs;
   sending the set R from the first QKCA to A over the second Q-link; and
   A and B using the set R as a key to encrypt and send information over the TC-link.

2. A method of establishing a secure communication link between first and second users A and B in a quantum network ("Q-network"), comprising:
   establishing a direct communication between A and B initially over only via a traditional communication link (TC-link);
   establishing A and B to be in direct communication with respective first and second quantum key certification authorities (QKCAs) via respective first and second Q-links:
   sending a set R of truly random bits from the second QKCA to B over the first Q-link;
   sending the set R from the second QKCA to the first QKCA over a third Q-link connecting the first and second QKCAs;
   sending the set R from the first QKCA to A over the second Q-link; and
   A and B using the set R as a key to encrypt and send information over the TC-link.

3. The method of claim 2, wherein A and the first and second QKCAs are separate.

4. The method of claim 3, wherein B and the first and second QKCAs are separate.

5. The method of claim 2, including:
   at A, encrypting data D using set R as an encryption key to form encrypted data D* and transmitting D* over the TC-link directly to Bob; and
   at B, receiving and decrypting encrypted data D* using set R as a decryption key to recover data D.

6. The method of claim 2, wherein the second QKCA includes a session manager and a true random number generator that operates to generate the set R.

7. The method of claim 2, further comprising A and B using set R as an authentication key to securely communicate over the TC-link.

8. The method of claim 2, further comprising:
   establishing a Q-link directly between A and B; and
   authenticating the Q-link using the set R.

* * * * *